United States Patent [19]

Farmer

[11] 4,252,779
[45] * Feb. 24, 1981

[54] SYNTHETIC IMOGOLITE

[75] Inventor: Victor C. Farmer, Aberdeen, Scotland

[73] Assignee: National Research Development Corp., London, England

[*] Notice: The portion of the term of this patent subsequent to May 1, 1996, has been disclaimed.

[21] Appl. No.: 33,402

[22] Filed: Apr. 26, 1979

Related U.S. Application Data

[63] Continuation of Ser. No. 889,117, Mar. 22, 1978, Pat. No. 4,152,404.

[30] Foreign Application Priority Data

Mar. 28, 1977 [GB] United Kingdom ............... 12957/77

[51] Int. Cl.³ ............................................ C01B 33/26
[52] U.S. Cl. ................................................... 423/327
[58] Field of Search ............................... 423/327-330; 252/317, 453, 455 R

[56] References Cited

U.S. PATENT DOCUMENTS

| | | | |
|---|---|---|---|
| 2,844,523 | 7/1958 | Veltman et al. | 252/453X |
| 3,252,917 | 5/1966 | Mindick et al. | 252/455 R |
| 4,152,404 | 5/1979 | Farmer | 423/328 |

FOREIGN PATENT DOCUMENTS 953605  8/1974  Canada .................................... 423/327

OTHER PUBLICATIONS

Wada, "The American Mineralogist", vol. 54, Jan.-Feb. 1969, pp. 50–71.

*Primary Examiner*—Edward J. Meros
*Attorney, Agent, or Firm*—Oblon, Fisher, Spivak, McClelland & Maier

[57] ABSTRACT

An inorganic material related to imogolite, a rare constituent of soil, which forms gels with under 1% solids concentration, is synthesized by digesting (at pH 3.1 to 5.0) soluble hydroxyaluminium complexes freshly formed at pH 3.2 to 5.5 in aqueous solution with restricted aluminium concentration.

7 Claims, No Drawings

SYNTHETIC IMOGOLITE

This is a continuation of application Ser. No. 889,117, filed Mar. 22, 1978, now U.S. Pat. No. 4,152,404.

This invention relates to an inorganic material, which is a fibrous product having tubular structure related to, or resembling, the natural product imogolite.

Imogolite is a regular polymeric hydrated aluminium silicate which is found principally in weathered volcanic deposits, often in the form of thin gelatinous films, and consists of long tubes (for example 1 to 10 micrometers) with an outside diameter of around 22 Å and inside diameter about 10 Å. The tubes are partially aligned in bundles giving a highly porous material (pore space around 60%) with pores of effectively about 9 Å diameter, affording a surface area of about 1000 $m^2g^{-1}$, containing in the natural state from 10 to 45 g water per 100 g dry mineral at relative humidity from 0.03 to 1. The water can be pumped off under vacuum or by heating in air to 150° C., the dried material remaining stable up to about 300° C.

The tubes can be dispersed by subjecting the material to ultrasonic treatment in an acidic solution of a pH of 3 to 5, and can be re-coagulated on adjusting the pH to 7.5 or more, this being the reverse of usual behaviour in clays.

On the basis of electron diffraction pattern, composition and the proven presence of orthosilicate anions, it has been proposed that the walls of the tubes have a structure like that of a single sheet of gibbsite ($Al(OH)_3$) with orthosilicate groups replacing the inner hydroxyl surface of the gibbsite tube. This gives an empirical formula $(HO)_3Al_2O_3SiOH$, which is also the sequence of atoms encountered on passing from the outer to the inner surface of the tubular model. Natural samples have compositions in the range $Al_2O_3(SiO_2)_{1.0-1.2}(H_2O)_{2.3-3.0}$.

Therefore this invention consists of a method of synthesising an inorganic material which is a fibrous product having tubular structure related to, or resembling, the natural product imogolite, (for example being 10–15% larger in tube diameter), the method comprising digesting a solution of pH from 3.1 to 5.0, containing soluble hydroxyaluminium silicate (preferably orthosilicate) complexes formed at pH 3.2 to 5.5 in aqueous solution, (the digestion being preferably in the presence of sufficient dissolved silica to inhibit boehmite formation), the concentration of Al (other than in already-formed imogolite or stable complexes) being not more than 50 (preferably not more than 25, more preferably not more than 15) millimoles per liter, and the product displaying discernible electron diffraction peaks at 1.4 Å, 2.1 Å and 4.2 Å.

Further aqueous hydroxyaluminium silicate solution may be added in steps during the digestion to keep the concentration continuously high but within the above limits. Hydroxyaluminium silicate solutions are best freshly formed and kept cool. Preferably the adjusted-pH solution is held at 40° C. to 170° C., preferably 90° C. to 130° C., conveniently 95° C. to 100° C., at least until the yield of product reaches a maximum (typically taking 1 to 60 days.) Exemplary durations are 20 days at 60° C. and 1–3 days at 100° C. The temperature range is not mandatory, but, at excessive temperatures in the wet, imogolite decomposes to boehmite or kaolinite and much silica remains in solution, while at lower temperatures the reaction times become prolonged. The preferred pH of formation of the soluble hydroxyaluminium silicate complexes is around 4.5, approached gradually from lower pH values. At lower pH, especially less than 4.0, formation of complexes is likely to be incomplete or slow unless the solution has experienced an excursion to higher pH values, whilst at higher pH, especially over 5.0, precipitates are likely to form, all the more so in more concentrated solutions. Any precipitate should be redissolved or redispersed quickly to a pH more than 3.5. Redispersal may be in perchloric, hydrochloric, nitric, formic or benzoic acids, preferably in a mixture of acetic with nitric or perchloric acids. Formation of synthetic imogolite at pH 4.7 to 5.0 is erratic and depends on the exact history of the solutions. Thus, in that pH range, imogolite forms with difficulty if the solutions were too alkaline and had been re-acidified or if the solutions were allowed to age. Therefore the preferred pH for the digestion is not more than 4.6, and this digestion pH may be reached by acidification with non-complexing acids. Further, since the solution tends to become more acidic during digestion, the preferred starting pH is not less than 3.5.

Heating excessively concentrated hydroxyaluminium silicate solutions produces weakly fibrous or non-fibrous products which do not form gels, and the situation cannot be retrieved by subsequent dilution. The preferred atomic ratio of Si to Al in the method is from 0.42 to 0.58, and should not exceed 0.8.

Chloride ion, if present, preferably does not exceed 25 millimolar. Acetic acid or similar weak organic acid is advantageously present preferably in a molar concentration at least half that of the aluminium, provided sufficient mineral acid, e.g. perchloric acid, is present to inhibit organic anion formation. The concentration of organic acid should not exceed 25 mM, or twice that of the aluminium, whichever is the greater. Concentrations more than the optimum can decrease the rate of formation of synthetic imogolite.

The product may be isolated from its colloidal solution, preferably by drying, for example spray-drying, or by freeze-drying after precipitating a gel with alkali or added salt e.g. chloride or phosphate and centrifuging which may be repeated after washing and mechanical agitation of the gel), or alternatively by foam-flotation using an anionic detergent. In this isolated form, it may find application as a molecular sieve, catalyst support, coagulant (i.e. gel-former) or sorbent.

Synthetic imogolite may incorporate other ions replacing Al or Si by isomorphous substitution (e.g. Cr(III) or Fe(III), or Ge or Ti respectively) and may be activated for catalysis by heating or exposing to hydrogen.

Coherent films can be formed by evaporating imogolite colloidal solutions on to a flat surface; such films may find application as membranes.

Instead of this isolation, the solution held for a while at 60° C. to 140° C. may be made alkaline, for example with ammonia. A gel results, which may find application in its own right.

The product need not be isolated from its colloidal solution. Instead, for example, it may be used as a flocculant, a hydrophilizer or a thickener.

The invention extends to the product of this method, optionally isolated as set forth, to synthetic imogolite howsoever made, and to its dispersions.

The invention also extends to a gel comprising synthetic imogolite, including a gel with a solids concentration of under 1% by weight e.g. under 0.5% e.g. 0.1%.

The invention will now be described by way of example.

EXAMPLE 1

An aqueous solution was prepared containing 1.4 millimolar silica $SiO_2$ in the form of $Si(OH)_4$ monomer (silicic acid) and 2.4 millimolar aluminium trichloride $AlCl_3$. As chloride ions in excess of about 25 millimolar appear to inhibit formation of imogolite, aluminium trichloride solutions should be not more concentrated than 8 mM. On partial neutralisation, the aluminium trichloride gives rise in solution to hydroxyaluminium cations, which combine with the silicic acid to form a soluble hydroxyaluminium orthosilicate complex. A slight excess of silica over the theoretical requirement for imogolite was used to inhibit formation of boehmite ($\gamma$-AlOOH). The solution was adjusted to pH 5 with 1 molar sodium hydroxide. Then 1000 ml of the solution was acidified by adding 1 millimole of hydrochloric acid and 1 millimole of acetic acid: the resultant pH was 4.35. The acidified solution was heated up to 95° C. in an inert vessel and maintained at that temperature, either under reflux conditions or in a sealed pressure vessel, each giving the same results.

After 5 days the bulk of gel precipitated by ammonia reached a maximum and quantities of a synthetic mineral related to, or resembling, the natural product imogolite had formed. The fibrous morphology, electron diffraction pattern (with sharp peaks at 1.4 Å, 2.1 Å and 4.2 Å) and infrared spectrum all supported this conclusion.

The vessel containing the synthetic mineral had its contents rendered slightly alkaline by addition of ammonia; then the contents were centrifuged. A bulky gel resulted, believed to incorporate an open network of cross-linked synthetic-imogolite tubes, and having a solids content by weight of 0.1%.

EXAMPLES 2 to 9

Example 1 was repeated, except that the amount of the hydrochloric acid was varied.

| Example No. | mmol HCl added per 1000 ml | Initial pH | Time for maximum gel bulk | pH Thereafter | Volume of gel obtained (arbitrary units) |
| --- | --- | --- | --- | --- | --- |
| 2 | 0 | 4.55 | 5 days | 4.0 | 14 |
| 3 | 0.5 | 4.45 | 5 days | 3.6 | 24 |
| 4 | 0.68 | 4.1 | 3 days | 3.5 | 20 |
| 5 | 1.02 | 4.0 | 3 days | 3.4 | 20 |
| 6 | 1.35 | 3.9 | 3 days | 3.3 | 20 |
| 7 | 2.04 | 3.8 | 3 days | 3.2 | 19 |
| 8 | 2.72 | 3.7 | 3 days | 3.2 | 18 |
| 9 | 3.40 | 3.6 | 3 days | 3.2 | 15 |

EXAMPLES 10 to 15

Example 1 was repeated, except that the amount of acetic acid was varied substantially, under two different amounts of hydrochloric acid. Acetic acid can be seen to be inessential although advantageous. Also, the solution containing $Si(OH)_4$ and $AlCl_3$ was adjusted to pH 5 before adding the hydrochloric and acetic acids, and was then heated as in Example 1, to 95° C.

| Ex. No. | Millimoles of reagent per liter | | | | Initial pH | Days for max. gel | Final pH | Volume of gel* |
| --- | --- | --- | --- | --- | --- | --- | --- | --- |
| | $Si(OH)_4$ | $AlCl_3$ | HCl | HAc | | | | |
| 10 | 1.33 | 2.4 | 1 | 0 | 3.9 | 3 | 3.3 | 16 |
| 11 | 1.33 | 2.4 | 1 | 2.2 | 4.1 | 5 | 3.5 | 18 |
| 12 | 1.33 | 2.4 | 1 | 22.0 | 3.6 | 3 | 3.2 | 20 |
| 13 | 1.33 | 2.4 | 2.5 | 0 | 3.6 | 5 | 3.2 | 18 |
| 14 | 1.33 | 2.4 | 2.5 | 2.2 | 3.8 | 3 | 3.2 | 18 |
| 15 | 1.33 | 2.4 | 2.5 | 22.0 | 3.5 | 3 | 3.2 | 20 |

*arbitrary units.

EXAMPLES 16 to 19

From these Examples, it will be seen that NaCl (preferably chloride ion generally) inhibits imogolite formation and so limits the concentration of $AlCl_3$ which can be used. Procedure was as in Example 10, except that NaCl was added before the adjustment to pH 5. Note that 7 millimoles NaCl were unavoidably present derived from the $AlCl_3$ in each of Examples 16–19 before any was added, so that the total amounts present were 7, 17, 37 and 107 millimoles respectively.

| Example No. | Millimoles reagent per liter | | | | | Initial pH | Days for max. gel | Final pH | Volume of gel |
| --- | --- | --- | --- | --- | --- | --- | --- | --- | --- |
| | $Si(OH)_4$ | $AlCl_3$ | NaCl | HCl | HAc | | | | |
| 16 | 1.33 | 2.4 | 0 | 1 | 2.2 | 4.5 | 2 | 3.3 | 15 |
| 17 | 1.33 | 2.4 | 10 | 1 | 2.2 | 4.5 | 5 | 3.3 | 14 |
| 18 | 1.33 | 2.4 | 30 | 1 | 2.2 | 4.5 | 5 | 3.2 | 7 |
| 19 | 1.33 | 2.4 | 100 | 1 | 2.2 | 4.4 | 5 | 3.2 | 4 |

EXAMPLES 20 to 25

These Examples show that synthetic imogolite forms in the presence of 0.1 M $NaClO_4$, and that $Al(ClO_4)_3$ of at least 9.6 mM can be used in the synthesis. Procedure was as in Examples 16 to 19, but replacing $AlCl_3$ by $Al(ClO_4)_3$ and NaCl by $NaClO_4$. Solutions were diluted where necessary to equalise Al and Si concentrations before measuring yield of gel.

| Example No. | Millimoles reagent per liter | | | | | Initial pH | Days for max gel | Final pH | Volume of gel |
| --- | --- | --- | --- | --- | --- | --- | --- | --- | --- |
| | $Si(OH)_4$ | $Al(ClO_4)_3$ | $NaClO_4$ added | $NaClO_4$ total | $HClO_4$ | | | | |
| 20 | 1.33 | 2.4 | 0 | 7.2 | 1 | 4.4 | 1 | 3.2 | 12 |
| 21 | 2.66 | 4.8 | 0 | 14.4 | 2 | 4.3 | 5 | 3.2 | 20 |
| 22 | 4.00 | 7.2 | 0 | 21.6 | 3 | 4.3 | 5 | 3.3 | 20 |
| 23 | 5.33 | 9.6 | 0 | 28.8 | 4 | 4.4 | 5 | 3.7 | 14 |
| 24 | 2.66 | 4.8 | 30 | 44 | 2 | 4.3 | 7 | 3.4 | 17 |

-continued

| Example No. | Millimoles reagent per liter | | | | | Initial pH | Days for max gel | Final pH | Volume of gel |
|---|---|---|---|---|---|---|---|---|---|
| | Si(OH)$_4$ | Al(ClO$_4$)$_3$ | NaClO$_4$ added | NaClO$_4$ total | HClO$_4$ | | | | |
| 25 | 2.66 | 4.8 | 100 | 114 | 2 | 4.3 | 7 | 3.8 | 15 |

EXAMPLES 26 to 31

In these Examples, Example 1 was repeated except that the aluminium salt was now aluminium iso-propoxide. Also, instead of hydrochloric and acetic acids, a variety of acids was used one at a time. The aluminium iso-propoxide was added as a 0.1 M solution in iso-propanol to an aqueous Si(OH)$_4$ solution, then the acid was added and the solution heated to 95° C.

| Example No. | Millimoles per liter | | Acid (all 2 mmol) | Initial pH | Days for max gel | Final pH | Volume of gel |
|---|---|---|---|---|---|---|---|
| | Si(OH)$_4$ | Al(iso-Pr)$_3$ | | | | | |
| 26 | 2.66 | 4.8 | none | 5.5 | — | 5.4 | 0 |
| 27 | 2.66 | 4.8 | HCl | 4.4 | 2 | 3.4 | 14 |
| 28 | 2.66 | 4.8 | HClO$_4$ | 4.5 | 2 | 3.5 | 14 |
| 29 | 2.66 | 4.8 | Acetic | 4.3 | 2 | 4.1 | 14 |
| 30 | 2.66 | 4.8 | Trichloracetic | 4.5 | 1 | 4.9 | 7 |
| 31 | 2.66 | 4.8 | Oxalic | 5.5 | — | 4.9 | 0 |

Acids which failed (as did oxalic) include phthalic, citric and lactic, which all form strong aluminium complexes. Successful acids (such as HCl) also include formic and benzoic, which do not form significant aluminium complexes. Salicylic acid, which forms a weak aluminium complex, was slightly successful. Presumably any complexant must be displaceable by silica if imogolite is to form.

EXAMPLES 32 to 34

These Examples show the use of alumina-silica precipitate to avoid excess salt concentrations which inhibit imogolite formation. In each, 500 ml of a sodium silicate solution, made from a fusion of 0.5 g quartz powder in 2.5 g Na$_2$CO$_3$, was slowly added to 100 ml of a solution containing 15 mmol Al(ClO$_4$)$_3$ and 10 mmol HClO$_4$, giving a solution of pH 4.4 containing a soluble hydroxyaluminium silicate complex. The solution was then adjusted to pH 5.5, and the resultant precipitate was separated from the supernatant by centrifuging. The supernatant was discarded and the precipitate immediately redispersed in 300 ml of 20 mM HClO$_4$. This dispersion and two dilutions from it were then heated at 95° C., when the precipitate rapidly redissolved. Synthetic imogolite formed in the diluted solutions as follows.

| Ex. No. | Solution composition, mmoles/liter | | | Initial pH | Heating time (days) | Final | Volume of gel* |
|---|---|---|---|---|---|---|---|
| | SiO$_2$ | ½(Al$_2$O$_3$) | HClO$_4$ | | | | |
| 32 | 1.7 | 4 | 2 | 4.6 | 5 | 3.2 | 19 |
| 33 | 5.1 | 12 | 6 | 4.3 | 5 | 3.1 | 25 |
| 34 | 17 | 40 | 20 | 4.1 | 5 | 3.5 | 11 |

*All volumes increased between 2 and 5 days. Gel volumes were measured on solutions diluted to a standard 2.0 mmol Al/1000ml.

In further experiments (not described in detail) based on Examples 32–34, alumina and silica were more completely precipitated from solutions adjusted to pH 6.5 or pH 8, rather than pH 5.5, and the precipitates obtained were as satisfactory for imogolite synthesis provided they were immediately redissolved in acid as described for Examples 32 to 34 above.

Other methods of reducing salt concentrations (seen from Examples 24 and 24 to inhibit imogolite formation) should also be satisfactory in promoting formation of imogolite: e.g. partial neutralisation of the aluminium-salt and silica solution with an anion-exchange resin in the OH form, rather than with NaOH, Na$_2$CO$_3$, or the like; or ensuring that the salt formed is sparingly soluble (e.g. potassium perchlorate), so that it can be removed by filtration, or using an aluminium alkoxide, e.g. with tetraalkyl silicate, instead of an inorganic aluminium salt. In further trials, Example 33 was repeated but, in place of the perchloric acid for redispersing the precipitate, there were successfully used hydrochloric, nitric, formic and benzoic acids in turn. No gel was obtained when sulphuric acid was used, and a reduced yield was obtained with acetic acid alone. The best yields were obtained with a mixture of perchloric acid and acetic acid, and these conditions were then standardised in later experiments.

EXAMPLES 35 to 39

Each of these Examples 35 to 39 has three versions, a 96° C., a 110° C. and a 120° C. version.

A preparation of a reactive alumina-silica sol is as follows: 5 liters of solution containing 1000 ppm SiO$_2$ (prepared as described below) were added over 30 minutes with vigorous stirring, to 150 m moles (56.27 g) Al(NO$_3$)$_3$.9H$_2$O dissolved in 126 ml of 1 M HClO$_4$ and diluted to 1 liter. This gave 6 liters of a slightly opalescent sol which cleared in about 20 minutes. After standing 1 hour, 1 M NaOH was added dropwise to pH 4.5, when the sol was again allowed to clear by standing for 1 hour. Drop-wise addition of 1 M NaOH was then continued to pH 6.8. The resulting precipitate was spun down in 6×1 liter polypropylene bottles at 2000 rpm for 30 minutes. The clear supernatants were discarded, and the precipitates combined by dispersing them in a solution containing 30 ml 1 M HClO$_4$ and 43 ml of 1.74 M acetic acid, finally adjusting the total volume to one liter. This dispersion rapidly cleared.

The concentrated stock solution, containing 150 mM Al, about 80 mM Si, 30 mM HClO$_4$ and 75 mM CH$_3$COOH, was stored in a cold room and used in subsequent experiments. Its pH was around 3.9–4.2.

The 1000 ppm SiO$_2$ solution was prepared by fusing 5 g quartz with 25 g anhydrous Na$_2$CO$_3$ and then dissolving the melt in 5 l distilled water. An alternative procedure for preparing the 1000 ppm SiO$_2$ solution would have been to dissolve 22 g Na$_2$SiO$_3$.9H$_2$O (containing 5 g SiO$_2$ by analysis) in 5 liters distilled water containing 160 ml 1 M Na$_2$CO$_3$. The presence of the carbonate in this procedure helps in obtaining a clear reactive final dispersion.

In making the above stock solution, the silicate solution is added to the acidified Al(NO$_3$)$_3$ solution, so that the reaction forming the alumina-silica complex proceeds always in acid solution. Reversing the order of addition, i.e. adding the Al(NO$_3$)$_3$ solution (without added acid) to the sodium silicate, gives a precipitate formed at pH over 7. This precipitate can also be dispersed in perchloric and acetic acid, as described above to give opalescent concentrated stock solution, which also gives synthetic imogolite when diluted to 10 mM Al and heated at 96° C., but at a lower yield.

The concentrated stock solution was diluted to give the concentrations below, and then heated in inert plastics bombs in an oven at 96° C., or in an autoclave for 110° C. and 120° C. The results indicated that there was little or no advantage in working at temperature above 100° C., and that the yields of gel decreased at concentrations higher than 10 mM Al. An opalescence, probably due to boehmite, appeared at 120° C. in the more dilute solutions.

the concentration of imogolite was built up in increments, each addition of the concentrated stock solution of Example 35 being converted to synthetic imogolite under reflux before more reagent was added. In the present Example, the volumes of stock solution added were adjusted to introduce 10 m mol/1000 ml of reactive Al, and other components of the stock solution in proportion, at each addition. Initially (day 0), 50 ml stock solution was diluted to give 750 ml containing 10 m mol/liter of Al, and the solution heated to boil gently under reflux. Subsequent additions of stock solutions were added at 2-day intervals, and the gel volumes were monitored as below:

| Day | Before stock solution added mmol Al per liter | Gel volume (1 mM Al) | Stock solution increment ml |
|---|---|---|---|
| 2 | 10 | 20 | 54 |
| 4 | 19.4 | 23 | 57 |
| 6 | 28 | 22 | 62 |
| 8 | 34.6 | 28 | 66 |
| 10 | 42.3 | 25 | 71 |
| 12 | 49.5 | 21 | 76 |
| 14 | 56.3 | 20 | 81 |
| 16 | 62.5 | 18 | 87 |
| 18 | 68.3 | 18 | 93 |
| 20 | 73.8 | 17 | — |
| 28 | 73.8 | 20 | — |

| Example No. | mmol Al per 1000 ml | Volume of gel, measured on solutions diluted to 1 mmol Al/1000 ml. | | | | | | | | |
|---|---|---|---|---|---|---|---|---|---|---|
| | | 120° C. | | | 110° C. | | | 96° C. | | |
| | | day 1 | day 2 | day 3 | day 1 | day 2 | day 3 | day 1 | day 2 | day 3 |
| 35 | 10 | 13 | 16 | 16 | 12 | 17 | 20 | 13 | 18 | 20 |
| 36 | 15 | 13 | 16 | 16 | 10 | 15 | 17 | 10 | 14 | 16 |
| 37 | 20 | 10 | 11 | 12 | 6 | 11 | 12 | 6 | 10 | 12 |
| 38 | 25 | 7 | 10 | 10 | 5 | 9 | 10 | 5 | 7 | 9 |
| 39 | 30 | 7 | 8 | 8 | 4 | 6 | 7 | 4 | 5 | 6 |

Gel volumes decreased rapidly at temperatures below 90° C. At 60° C., a gel volume of only 6 units (measured at 2.5 m mol Al/1000 ml) was obtained after incubating solutions containing 10 mM and 5 mM per 1000 ml for as long as 1 month. This volume did not increase after long incubation.

A good yield of gel was however obtained at 60° C. by incubating a solution prepared as follows: A solution containing 2.5 mM Al(ClO$_4$)$_3$ and 1.3 mM Si(OH)$_4$ (prepared by hydrolysis of tetraethoxysilane) was adjusted to pH 5, then re-acidified (to pH 4.3) to give concentrations of 0.5 mM perchloric acid and 1.25 mM acetic acid. After 21 days, the volume of gel, measured on the undiluted solution, was 23 units.

EXAMPLE 40

Since gel formation is inhibited by high concentrations of reagent, a procedure was developed in which Thus substantial concentrations of synthetic imogolite can be prepared. The pH of the starting solution was 4.5, but later remained in the range 3.3–3.6 during the additions.

Other patterns of addition of stock solution attempting to increase the concentration more rapidly gave lower gel volumes e.g. by increasing the frequency of additions to one day intervals instead of two, or by increasing the volumes of the stock solution added at each 2-day increment by 50%.

EXAMPLES 41 to 48

Examples 20 to 23 were repeated, but replacing Al(ClO$_4$)$_3$ and HClO$_4$ with either Al(NO$_3$)$_3$ and HNO$_3$ (Examples 41 to 44), or AlCl$_3$ with HCl (Examples 45 to 48). These established that perchlorate is better than nitrate, and nitrate better than chloride.

| Example | mmol reagent per 1000 ml | | | Initial pH | Days for max. gel | Final pH | Volume of gel (2.5 mM) |
|---|---|---|---|---|---|---|---|
| | Si(OH)$_4$ | Al(NO$_3$)$_3$ | HNO$_3$ | | | | |
| 41 | 1.33 | 2.4 | 1 | 4.6 | 1 | 3.2 | 14 |
| 42 | 2.66 | 4.8 | 2 | 4.5 | 5 | 3.3 | 20 |
| 43 | 4.00 | 7.2 | 3 | 4.4 | 7 | 3.8 | 14 |
| 44 | 5.33 | 9.6 | 4 | 4.4 | 7 | 3.8 | 8 |
| | Si(OH)$_4$ | AlCl$_3$ | HCl | | | | |
| 45 | 1.33 | 2.4 | 1 | 4.7 | 2 | 3.2 | 15 |
| 46 | 2.66 | 4.8 | 2 | 4.6 | 2 | 3.2 | 15 |
| 47 | 4.00 | 7.2 | 3 | 4.6 | 5 | 3.6 | 8 |

| 48 | 5.33 | 9.6 | 4 | 4.5 | 5 | 3.7 | 7 |

EXAMPLES 49 to 54

These Examples were performed to confirm that the atomic ratio of Si to Al in the reacting solutions should be near 0.5, preferably within the limits 0.42–0.58 for optimum yields. Excess silica is preferable to too little silica. The general procedure followed that of Example 23. Examples 49 to 54 are according to the invention but 49, 50 and 54 are non-preferred.

| Example | mmol reagent per 1000 ml | | | Initial pH | Days for max. gel | Final pH | Si:Al | Volume of gel (2.5 m Al) |
|---|---|---|---|---|---|---|---|---|
| | Al(ClO$_4$)$_3$ | Si(OH)$_4$ | HClO$_4$ | | | | | |
| 49 | 10 | 7.5 | 5 | 4.3 | 2 | 3.8 | 0.75 | 7 |
| 50 | 10 | 6.7 | 5 | 4.3 | 2 | 3.7 | 0.67 | 11 |
| 51 | 10 | 5.8 | 5 | 4.3 | 2 | 3.5 | 0.58 | 18 |
| 52 | 10 | 5.0 | 5 | 4.3 | 2 | 3.3 | 0.50 | 20 |
| 53 | 10 | 4.2 | 5 | 4.3 | 2 | 3.1 | 0.42 | 17 |
| 54 | 10 | 3.3 | 5 | 4.3 | 1 | 3.1 | 0.33 | 6 |

EXAMPLES 55 and 56

These Examples examine the nature of the products formed at high concentrations of the stock solution described in Examples 35–39. This stock solution was heated undiluted and at various dilutions at 96° C. for 7 days:

| Example No. | mmoles reagent/liter | | | | pH initial | pH final | Gel Volume (1 mM Al) |
|---|---|---|---|---|---|---|---|
| | Al | Si | HClO$_4$ | HAc | | | |
| 55 | 10 | 5.3 | 2 | 5 | 4.3 | 3.5 | 23 |
| 56 | 30 | 15.9 | 6 | 15 | 4.2 | 4.0 | 7 |
| Comparative | 90 | 47.7 | 18 | 45 | 4.1 | 4.1 | 0 |
| Comparative | 150 | 79.5 | 30 | 75 | 4.0 | 4.4 | 0 |

After heating, the undiluted stock solution was no longer reactive, and no gel formed when it was diluted to the 10 mM Al level and heated at 96° C.

The products formed in the above four experiments were compared by electron microscopy, electron diffraction, and infrared spectroscopy. At the 10 mM Al level well-ordered synthetic imogolite had formed with the characteristic diffraction pattern and morphology. At higher concentrations of fibrous morphology was feebly developed or absent. The characteristic diffraction features of synthetic imogolite at 1.4 Å, 2.1 Å, and 4.2 Å (associated with repeat distances along the fibre axis) became increasingly broad at 30 mM and not all were discernible at 90 mM Al or 150 mM Al. Certain broad diffraction bands of synthetic imogolite, most obviously those near 2.3 Å and 3.45 Å, persisted at all concentrations, and were given also by the unheated stock solution. Stock solution diluted to the 10 mM Al level and heated to 60° C. for 1 month gave a product with diffraction similar to the 90 mM Al level at 96° C.

I claim:

1. An inorganic material, which is a fibrous product having a tubular structure resembling the natural product imogolite but having a 10–15% larger tube diameter and displaying discernible electron diffraction peaks at 1.4 Å, 2.1 Å and 4.2 Å, the walls of said tubes having a structure like that of a single sheet of gibbsite with orthosilicate groups replacing the hydroxyl groups on the inner surfaces of said tubes.

2. A membrane composed of the synthetic imogolite material of claim 1 cast into a coherent film.

3. A colloidal solution of the synthetic imogolite-like material of claim 1.

4. The colloidal solution of claim 3, prepared by:
   forming a soluble hydroxyaluminum silicate complex by reacting soluble silica or a soluble silicate compound with an aluminum compound capable of reacting with silica to form a soluble hydroxyaluminum silicate complex in an aqueous solution at a pH of 3.2 to 5.5, the concentration of aluminum from said aluminum compound other than already formed imogolite or stable hydroxyaluminum silicate complex ranging up to 50 millimoles per liter and the Si:Al atomic ratio of the silica and aluminum compound reactants ranging from 0.33 to 0.8; and
   digesting said aqueous solution of hydroxyaluminum silicate at a pH of from 3.1 to 5.0 thereby forming a colloidal dispersion of said inorganic material.

5. A gel of synthetic imogolite-like material of claim 1, wherein said gel possesses a solids concentration of less than 1% by weight.

6. The gel of claim 5, wherein said solids concentration is less than 0.5%.

7. The gel of claim 6, wherein said solids concentration is 0.1%.

* * * * *